United States Patent Office 3,779,994
Patented Dec. 18, 1973

3,779,994
METHOD FOR PREPARING POLYURETHANE FROM POLYISOCYANATE AND POLYALKANOLAMINE USING A BLOCKING ACID SALT
Louis L. Wood, Rockville, Md., assignor to
W. R. Grace & Co., New York, N.Y.
No Drawing. Filed Oct. 26, 1972, Ser. No. 300,937
Int. Cl. C08g 22/16
U.S. Cl. 260—77.5 AQ                    4 Claims

ABSTRACT OF THE DISCLOSURE

The invention disclosed is a method for preparing new curable water soluble polymers. The product polymers upon being cured are characteristically water insoluble and when applied to fibers provide useful wet strength additives.

---

This invention relates to a method for preparing curable water soluble polymers which upon being cured are water insoluble. More particularly, the present invention provides tough, abrasive resistant polyureas from polyisocyanates and polyamines.

It is known in the prior art that attempts to prepare ureas by reaction of isocyanates with amines proceeds rapidly and energetically and that application in polymerization reactions, i.e., reactions of polyisocyanates with polyamines generally, does not result in desirable water soluble thermoplastics. Instead, various complex branched, crosslinked, non-soluble, non-thermoplastic gels typically form during the reaction. It has been found, however, that by practice of the present invention, reactions of polyisocyanates with polyamines are possible when blocked by an acid salt.

Generally stated, the present invention provides new improved polyurethanes prepared by reaction polyisocyanates with polyalkanolamines which contain a blocking acid salt. The resultant reactant mixture of non-crosslinked polyureas may then be reacted with various components to effect final curing. Final curing may be by removal of the aqueous solvent. The cured crosslinked polyureas are characteristically tough, abrasion resistant resins having broad spectrum utility.

Recognizing that the present reaction mechanism may be subject to speculation, it appears that the present reaction proceeds because the acid salt disposed onto the amines blocks what otherwise would be an instantaneous reaction with isocyanates.

Polyalkanolamines may be reacted with from equal molar amounts to large excesses of an acid. The acids which may be used to form the acid salts of the polyalkanolamine are the various weak and strong inorganic and organic acids. Such acids include sulfuric acid, phosphoric acid, hydrochloric acid, formic acid, acetic acid, benzoic acid, chloroacetic acid, para-nitrobenzoic acid, oxalic acid, iminodiacetic acid, nitrilotriacetic acid, and the like. The salts of the acid will form in aqueous solution. The reaction preferably may be effected for times ranging from about 2 minutes to about 24 hours, with aging at a temperature of about −5° C. to about 150° C. To the resultant salt then maintained at a temperature of about 0° C. to about 125° C. is added a polyisocyanate at a temperature in the range of about 0° C. to about 125° C. The molar ratio of amine groups to isocyanate groups is from about 1:1 or larger amounts to about 1:20 of amine groups as desired. Usually, it is desirable to include an excess of polyamine over the isocyanate such that the resultant polyureas contain free amino groups available for many supplemental reactions.

After stirring the reactants at about 0° C. to about 100° C. for about 2 minutes to about 8 hours, polymerization is complete and the resultant solution or slurry of essentially non-crosslinked polyaminopolyurethane is ready for subsequent fabrication, curing or applications as desired.

A broad spectrum of useful applications are possible for the present polyureas containing available amino groups. These applications are based on the ability of the present polyurethanes to form crosslinkable stable polymer solutions, which, after proper formulation, and upon drying, i.e., removal of the solvent, cure by crosslinking to give tough insoluble resins useful for impregnants, coatings or films and the like.

Examples of monomeric polyisocyanates useful herein include polyisocyanates and polyisothiocyanates which are PAPPI-1 (a polyaryl polyisocyanate as defined in U.S. Pat. No. 2,683,730) tolylene diisocyanate, triphenylmethane-4,4′,4″-triisocyanate, benzene-1,3,5-triisocyanate, toluene-2,4,6-triisocyanate, diphenyl-2,4,4′-triisocyanate, hexamethylene diisocyanate, xylylene diisocyanate, chlorophenylene diisocyanate, diphenylmethane-4,4′-diisocyanate, naphthalene-1,5-diisocyanate, xylene-alpha, alpha′-diisothiocyanate, 3,3′-dimethyl-4,4′-biphenylene diisocyanate, 3,3′-dimethoxy-4,4′-biphenylene diisocyanate, 2,2′,5,5′-tetramethyl-4,4′-biphenylene diisocyanate, 4,4′-methylenebis (phenylisocyanate), 4,4′-sulfonylbis (phenylisocyanate), 4,4′-methylene di-ortho-tolylisocyanate, ethylene diisocyanate, ethylene diisothiocyanate, trimethylenediisocyanate and the like. Mixture of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost. Also, polymeric polyisocyanates are especially useful in the practice of this invention, such as illustrated subsequently.

Examples of polyalkanolamines useful herein include without limitation, molecules having both hydroxy groups, or several hydroxy groups and amino groups. These alkanolamine members may be ordinarily attached to either aliphatic or aromatic molecules. Typically, the polyalkanolamines are those molecules having from about 2 hydroxyl units per amine unit. Specific examples of polyalkanolamines include, but are not limited to, materials such as mono-, di-, and tri-ethanolamine; mono-, di-, and tri-propanolamine; N,N′-dihydroxyethyl-ethylene diamine and the like.

They are considered as members of the broad class of products derived from amines and polyamine reacted with alkylene oxides or hydroxyalkyl halides.

The systems of the present invention are particularly useful in wet and dry strength improvement additives for paper, impregnants, and bonding agents for paper fiber webs, and for non-woven and woven natural or synthetic fabrics; adhesives for films, foils, fabrics, fibers, tire cords, elastomers, leather, plastics, wood, ceramics, cellulosics, metals, non-wovens, and glasses; shrinkproofing of textiles; intermediates in the preparation of water-soluble cationic polyelectrolytes; surface primers; hydrophilic surface sizing; coating and modifying agents for woven and non-woven fibers and fabrics; bulking agents and stiffeners for webbings; retention aids; coagulants and flocculents; crosslinking agents for epoxy resins, isocyanated carboxylated, and halogenated polymers; protective and decorative coatings; molded articles; reactive intermediates for synthesis of flame retardants, soil release agents, fabric softeners, permanent press resin, dyeing assist agents and the like.

The following examples will aid in explaining, but should not be deemed as limiting, practice of the present invention. In all cases, unless otherwise noted, all parts and percentages are by weight.

EXAMPLE 1

1000 grams polyoxyethylene glycol having a weight average molecular weight of 1000 was outgassed by stirring at 110° C. for about 3–5 hours. The remaining glycol having a weight of about 980 grams was cooled to 50° C. and then added as a liquid over a period of 15–20 minutes under an inert nitrogen atmosphere, to 326 grams of tolylene diisocyanate. The tolylene diisocyanate had 80% by weight of the 2,4 isomer, and 20% by weight of the 2,6 isomer. The reaction temperature was maintained between about 50° C. and 60° C. with stirring continuing for 3–5 hours. Isocyanate capped polyoxyethylene glycol was recovered from this reaction.

EXAMPLE 2

To 105 grams of diethanol amine was passed dry hydrogen chloride until 36 grams was absorbed. The resultant viscous oil was identified as diethanol amine hydrochloride, remained liquid at 25° C. and the pH was 4. Next, to 337 grams of the isocyanate capped polyoxyethylene glycol prepared in Example 1 was added 33.8 grams of diethanol amine hydrochloride with good stirring at 70° C. for 8 hours. The resultant product became too thick to stir after standing 16 more hours at 70° C., the NCO content of the product was found to be 0.14 meq./gram (97.4% reacted), and the Brookfield viscosity at 70° C. was greater than $1 \times 10^6$ centipoise. The remaining product syrup was diluted with 100% by weight addition of water and the mixture converted to a homogeneous solution having a pH 3.5 by stirring at 70° C. for several hours.

EXAMPLE 3

371 grams of the polymer of Example 2 in 371 grams water was combined with 27.8 grams of epichlorohydrin over a period of about 4 hours at 60° C. with good stirring. Twenty grams of this product solution were dried at 100° C. for 1 hour to give 2 grams of a brown, tough elastomeric film which proved to be insoluble in water.

EXAMPLE 4

The procedure of Example 3 was repeated except that a 100 gram sample of the non-crosslinked reaction product was removed at hour intervals as follows:

| Solution | pH | Brookfield viscosity at 25° C. |
|---|---|---|
| Hour: | | |
| 1 ... Yellow solution | 5.5 | 74 centipoises. |
| 2 ... do | 5.5 | 100 centipoises. |
| 3 ... do | 5.5 | 125 centipoises. |
| 4 ... do | 5.5 | 200 centipoises. |
| 5 ... Reaction gelled approximately 4.5 hours | | |

A portion of the reaction product of Example 4 was taken after four hours and was made into a 250 ml. solution of 10% solids and 250 ml. solution of 1% solids. Two 60 ml. portions of each solution were soaked into Whatman #1 papers (6" x 6") and each paper was allowed to drain 3 minutes. Each paper was pressed between two sheets of untreated Whatman #1 paper by two passes in 90° directions with a 16 pound roller. The sheets of each formulation were cured in the oven at 105° C. for one hour.

A blank run was prepared as described above except that the paper was soaked in distilled water and dried at 105° C. for 1 hour. The wet and dry tensile strengths of the papers were measured according to ASTM 828,829. The results are as follows:

| Sample number 4 (percent by Wt.) | Tensile strengths, lbs./in. width | |
|---|---|---|
| | Wet | Dry |
| 1 | 4.3 | 13.4 |
| 0.1 | 1.50 | 11.7 |
| 0.01 | 0.59 | 12.4 |
| Blank | 0.39 | 11.4 |

These results clearly show the improved wet strength of the paper treated with the polyurethane-epichloroydrin product over the untreated paper.

It is understood that the foregoing detailed description is given merely by way of illustration and that many variations may be made therein without departing from the spirit of this invention.

What is claimed is:

1. A method for preparing polyurethane which comprises mixing polyisocyanate with polyalkanolamine containing a blocking acid salt moiety and forming a non-crosslinked polyurea product, said polyalkanolamine selected from the group consisting of mono-, di-, and tri-ethanolamine, mono-, di-, and tri-propanolamine, and N,N'- dihydroxyethyl-ethylene diamine, said acid salt being derived from an acid selected from the group consisting of sulfuric acid, phosphoric acid, hydrochloric acid, formic acid, acetic acid, benzoic acid, chloroacetic acid, paranitrobenzoic acid, oxalic acid, iminodiacetic acid, and nitriloacetic acid, and removing the blocking acid salt and thereby preparing polyurethane.

2. The method of claim 1 wherein the polyalkanolamine containing blocking acid salt is aged for a period of time from about 2 minutes to about 24 hours at a temperature of about —5° C. to about 150° C. prior to mixing with polyisocyanate.

3. The method of claim 1 wherein polyisocyanate is added to said polyalkanolamine at a temperature of about 0° C. to about 125° C., and wherein the molar ratio of amine groups to isocyanate groups is from about 1:1 to about 1:20.

4. The method of claim 1 wherein the amine is diethanolamine, the acid salt is derived from hydrochloric acid.

References Cited
UNITED STATES PATENTS 3,663,516    5/1972    Vogt _____ 260—77.5 AQ M. J. WELSH, Primary Examiner U.S. Cl. X.R.

117—140 A, 155 R; 156—331